US008942156B2

(12) United States Patent
Yang et al.

(10) Patent No.: US 8,942,156 B2
(45) Date of Patent: Jan. 27, 2015

(54) METHOD FOR SUPPORTING ENHANCED MULTIMEDIA BROADCAST MULTICAST SERVICE (EMBMS), METHOD AND DEVICE FOR SENDING MBMS CONTROL CHANNEL (MCCH) MODIFICATION NOTICE

(75) Inventors: Ning Yang, Beijing (CN); Youjun Gao, Beijing (CN); Zhenping Hu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 133 days.

(21) Appl. No.: 13/580,597

(22) PCT Filed: Feb. 22, 2011

(86) PCT No.: PCT/CN2011/000276
§ 371 (c)(1),
(2), (4) Date: Aug. 22, 2012

(87) PCT Pub. No.: WO2011/100886
PCT Pub. Date: Aug. 25, 2011

(65) Prior Publication Data
US 2013/0003640 A1 Jan. 3, 2013

(30) Foreign Application Priority Data

Feb. 22, 2010 (CN) .......................... 2010 1 0112777
Feb. 22, 2010 (CN) .......................... 2010 1 0112780
Jun. 18, 2010 (CN) .......................... 2010 1 0211169
Jun. 22, 2010 (CN) .......................... 2010 1 0205445
Sep. 30, 2010 (CN) .......................... 2010 1 0297334

(51) Int. Cl.
*H04W 88/02* (2009.01)
*H04W 88/04* (2009.01)
(Continued)

(52) U.S. Cl.
CPC .............. *H04W 72/005* (2013.01); *H04W 4/06* (2013.01)
USPC .......................................... 370/312; 370/315

(58) Field of Classification Search
USPC ................................... 370/312, 329
See application file for complete search history.

(56) References Cited

U.S. PATENT DOCUMENTS

2010/0254295 A1* 10/2010 Ahn et al. ...................... 370/312
2013/0230013 A1* 9/2013 Seo et al. ...................... 370/329

FOREIGN PATENT DOCUMENTS

CN 101262626 A 9/2008
CN 101370238 A 2/2009
(Continued)

OTHER PUBLICATIONS

International Search Report (in Chinese with English translation) for PCT/CN2011/000276, mailed Jun. 2, 2011; ISA/CN.
(Continued)

*Primary Examiner* — Kevin C Harper
*Assistant Examiner* — Derrick V Rose
(74) *Attorney, Agent, or Firm* — Harness, Dickey & Pierce, P.L.C.

(57) ABSTRACT

A method, system and device for supporting enhanced Multimedia Broadcast Multicast Service (eMBMS) in a relay network are disclosed. The method includes that: a network side sends a message to a relay node used to indicate a position of a Multicast Broadcast over Single Frequency Network (MBSFN) subframe relates to the eMBMS in a transmission frame; the relay node determines the position of the MBSFN subframe in the transmission frame according to the message, and makes the MBSFN subframe silent according to the determinate position; when a user terminal determines the existence of the MBSFN subframe made silent by the relay node in the transmission frame sent from the relay node, the user terminal receives the eMBMS sent by device except the relay node according to control information of the received eMBMS, thereby avoids the influence of the relay node to the user terminal supporting eMBMS.

37 Claims, 10 Drawing Sheets

(51) Int. Cl.
*H04W 72/00* (2009.01)
*H04W 4/06* (2009.01)

(56) References Cited

FOREIGN PATENT DOCUMENTS

| CN | 101516060 A | 8/2009 |
| CN | 101647250 A | 2/2010 |
| JP | 2009182944 A | 8/2009 |
| WO | WO-2008/115614 A2 | 9/2008 |
| WO | WO-2009021394 A1 | 2/2009 |
| WO | WO-2009126586 A2 | 10/2009 |

OTHER PUBLICATIONS

"Finding MCCH/MTCH." 3GPP TSG-RAN WG2 Meeting #66. May 4-8, 2009, San Francisco, USA. Agenda Item 6.3.1. Source: Huawei.

3GPP TR 36.912 V2.0.0. (Aug. 2009) 3rd Generation Partnership Project; Technical Specification Group Radio Access Network; Feasibility Study for Further Advancements for E-UTRA (LTE-Advanced) (Release 9). Sep. 2, 2009.

* cited by examiner

METHOD FOR SUPPORTING ENHANCED MULTIMEDIA BROADCAST MULTICAST SERVICE (EMBMS), METHOD AND DEVICE FOR SENDING MBMS CONTROL CHANNEL (MCCH) MODIFICATION NOTICE

CROSS-REFERENCE TO RELATED APPLICATIONS

This application is a 371 U.S. National Stage of International Application No. PCT/CN2011/000276, filed on Feb. 22, 2011, which claims priority to Chinese Patent Application Nos. 201010112777.9, filed on Feb. 22, 2010; 201010112780.0, filed on Feb. 22, 2010; 201010211169.3, filed on Jun. 18, 2010; 201010205445.5, filed on Jun. 22, 2010; and 201010297334.1, filed on Sep. 30, 2010. The contents of the above applications are incorporated herein by reference in their entirety.

FIELD OF THE INVENTION

The invention relates to the field of mobile communication technology, and particularly to a method, system and device for supporting an eMBMS in a relay network, a method and device for sending an MCCH modification notification in a relay network, and a method and device for sending configuration information for MCCH modification notification in a relay network.

BACKGROUND OF THE INVENTION

In Long Time Evolution (LTE) Release 9 of 3rd Generation Partnership Project (3GPP), an enhanced Multimedia Broadcast Multicast Service (eMBMS) can be transmitted in a multi-cell mode, i.e. a so-called Multicast/Broadcast over Single Frequency Network (MBSFN) mode. In this way, the data can be transmitted simultaneously by adopting the same modulation and coding scheme in multiple cells on the same physical resources. A terminal can merge signals received from different cells, and the frame structure of transmitting the signal is shown in FIG. 1. A terminal which supports the eMBMS can receive the same eMBMS received from multiple cells at the relay node, and the multiple received eMBMSs will not interfere with each other.

In LTE Release10, a Relay Node (RN) is introduced into the network as an important means for expanding system coverage and improving system capacity. In the Release10 network, the RN is similar to a base station which has an independent Physical Cell ID. Therefore, its network deployment scenario is similar to a pico cell, and a schematic diagram of the specific network architecture is shown in FIG. 2.

In the prior art, the RN communicates with its subordinate terminal in a unicast mode. If the RN does not support the MBSFN transmission and transmits unicast data in an MBSFN sub-frame structure shown in FIG. 1, the terminal which supports eMBMS will receive the unicast data sent from the relay node under the relay node, rather than the corresponding eMBMS data. Moreover, the received unicast service will be interfered greatly due to the impact of eMBMSs transmitted from other cells.

In addition, the MBMS Control Channel (MCCH) is a point-to-multipoint downlink channel in the LTE MBMS system, which is used to transmit control information from the network side to the User Equipment (UE) side. The network side indicates position information of the MCCH to the UE in a Broadcast Control Channel (BCCH), thus allowing the user equipment to read information transmitted on the MCCH according to the indicated position.

The information transmitted on the MCCH usually includes LTE MBMS information and relevant information of the radio resource allocation, where:

the MBMS information is adapted to indicate MBMSs available in a cell. For each service, it may include some information, such as, a service identifier (service ID), a session identifier (session ID);

the relevant information of the radio resource allocation refers to information about radio resource used in a cell which uses one or more MBMS service descriptions. For each service, the relevant information may include some information, such as, information of physical channel occupied by a service, transmission channel information.

When the information carried by the MCCH changes, for example the MBMS service changes, or session or radio carrying information changes, the network side needs to notify the user equipment, that is, the network side needs to send an MCCH modification notification to the user equipment. After receiving the MCCH modification notification, the user equipment will listen the MCCH to acquire new information changed.

However, in the LTE Release10, a problem to be solved is to eliminate the impact of introduction of the RN on the reception of the MBMS of the UE in the network in which the RN is introduced and to receive the MCCH modification notification timely, and those problems have no appropriate solution at present.

SUMMARY OF THE INVENTION

An embodiment of the invention provides a method, system and device for supporting an eMBMS in a relay network, in order to eliminate the impact of the relay node on the eMBMS.

An embodiment of the invention also provides a method and device for sending an MCCH modification notification in a relay network and a method and device for sending configuration information for MCCH modification notification in a relay network, in order to realize sending the MCCH modification notification and the configuration information for MCCH modification notification in the relay network.

A method for supporting an enhanced multimedia broadcast multicast service, eMBMS, in a relay network includes: receiving, by a relay node, a message for indicating the position of a Multicast/Broadcast over Single Frequency Network, MBSFN, sub-frame related to the eMBMS in a transmission frame, which is sent from the network side; and muting, by the relay node, the MBSFN sub-frame according to the position of the MBSFN sub-frame in the transmission frame indicated in the received message.

A relay node includes: a receiving unit configured to receive a message for indicating the position of a Multicast/Broadcast over Single Frequency Network, MBSFN, sub-frame related to the eMBMS service in a transmission frame, which is sent from the network side; a position acquiring unit configured to acquire the position of the MBSFN sub-frame in the transmission frame indicated in the message; and a muting unit configured to muting the MBSFN sub-frame according to the acquired position of the MBSFN sub-frame in the transmission frame.

A method for supporting an enhanced multimedia broadcast multicast service, eMBMS, in a relay network includes: determining, by the network side, a position of a Multicast/Broadcast over Single Frequency Network, MBSFN, sub-frame related to the eMBMS in a transmission frame; and sending a message for indicating the position of the MBSFN sub-frame related to the eMBMS in the transmission frame to a relay node according to the determined position.

A base station includes: a determination unit configured to determine the position of a Multicast/Broadcast over Single Frequency Network, MBSFN, sub-frame related to the eMBMS in a transmission frame; and a sending unit configured to send a message for indicating the position of the MBSFN sub-frame related to the eMBMS in the transmission frame to a relay node according to the determined position.

A method for supporting an enhanced multimedia broadcast multicast service, eMBMS, in a relay network includes: confirming, by a user equipment, whether there is an MBSFN sub-frame muted by a relay node in a transmission frame sent from the relay node; and receiving, by the user equipment, an eMBMS sent from a device other than the relay node, according to a received control information of the eMBMS, if the user equipment confirms the existence of the muted MBSFN sub-frame.

A user equipment is provided, which includes: a confirmation unit configured to confirm whether there is an MBSFN sub-frame muted by a relay node in a transmission frame sent from the relay node; a receiving unit configured to receive an eMBMS sent from a device other than the relay node, according to the received control information of the eMBMS service if the confirmation unit confirms the existence of the muted MBSFN sub-frame.

A system for supporting an enhanced multimedia broadcast multicast service, eMBMS, in a relay network includes a network-side device, a relay node and a user equipment, wherein the network-side device is configured to send to the relay node a message for indicating the position of an MBSFN sub-frame related to the eMBMS in a transmission frame; the relay node is configured to determine the position of the MBSFM sub-frame in the transmission frame according to the message sent from the network-side device and mute the MBSFN sub-frame according to the determined position; the user equipment is configured to receive an eMBMS sent from a device other than the relay node according to the received control information of the eMBMS.

A method for supporting an enhanced multimedia broadcast multicast service, eMBMS, in a relay network includes: receiving, by a relay node, MCCH configuration information sent from a network side; and sending, by the relay node, the received MCCH configuration information to a user equipment.

A relay node includes: a receiving unit configured to receive MCCH configuration information sent from the network side; and a sending unit configured to send the received MCCH configuration information to a user equipment.

A system for supporting an enhanced multimedia broadcast multicast service, eMBMS, in a relay network includes a network-side device, a relay node and a user equipment, wherein the network-side device is configured to send MCCH configuration information to the relay node; and the relay node is configured to receive the MCCH configuration information and send the received MCCH configuration information to the user equipment.

In the embodiment of the invention, the network side notifies the relay node of the position of an MBSFN sub-frame related to the eMBMS in a transmission frame, and the relay node mutes the MBSFN sub-frame according to the notified position, so that the user equipment can receive an eMBMS sent from a device other than the relay node. Thus, the impact of the relay node on the user equipment which supports the eMBMS is avoided, so that the user equipment can be receive the eMBMS successfully.

In addition, in the embodiments of the invention, the network side device sends MCCH configuration information to a relay node, the relay node forwards the MCCH configuration information to a user equipment, so that the user equipment can receive the MCCH information of the eMBMS accurately at the position and time of sending the MCCH according to the MCCH configuration information.

A method for sending an MCCH modification notification in a relay network provided by an embodiment of the invention includes: receiving, by a relay node, MCCH modification notification information from a base station; and sending the MCCH modification notification information to a user equipment.

A relay node device provided by an embodiment of the invention includes: a first receiving module configured to receive MCCH modification notification information from a base station; and a first sending module configured to send configuration information for MCCH modification notification received by a second receiving module to a user equipment.

In the above embodiment of the invention, the relay node sends the MCCH modification notification information received from the base station to the user equipment, so that the user equipment can read the modified MCCH content at an MCCH modification boundary according to the MCCH modification notification information, including MBMS information and radio resource allocation relevant information, thereby ensuring the user equipment to receive information related to MBMS.

A method for sending configuration information for MCCH modification notification in a relay network provided by the embodiment of the invention includes: receiving, by a relay node, the configuration information for MCCH modification notification sent from a base station.

A relay node device provided by an embodiment of the invention includes: a receiving module configured to receive configuration information for MCCH modification notification sent from a base station.

In the above embodiment of the invention, the base station sends the configuration information for MCCH modification notification to the relay node, which on one hand realizes sending the configuration information for MCCH modification notification in the central network, and on the other hand provides the possibility for the subsequent processing of the relay node, such as further sending the configuration information for MCCH modification notification to the user equipment or operating other configuration operations.

DETAILED DESCRIPTION OF THE INVENTION

The technical solutions in the embodiments of the invention will be described clearly and fully hereinafter in conjunction with drawings in the embodiments of the invention. Apparently, the embodiments described hereinafter are only a part of the embodiments of the invention, rather than all embodiments. All other embodiments obtained based on the embodiments in the invention by those skilled in the art without any creative work belong to the scope of protection of the embodiments of the invention.

The core idea of the embodiments of the invention is that: a relay node mutes an MBSFN sub-frame related to an eMBMS, so as to avoid the impact on the reception of the eMBMS of the user equipment.

Figure 1:
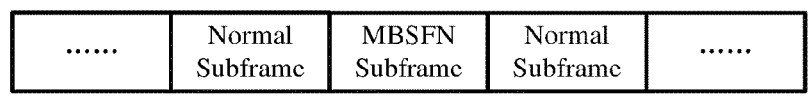
FIG. 1 is a schematic diagram of the transmission structure of an MBSFN sub-frame in the prior art.
Figure 2:
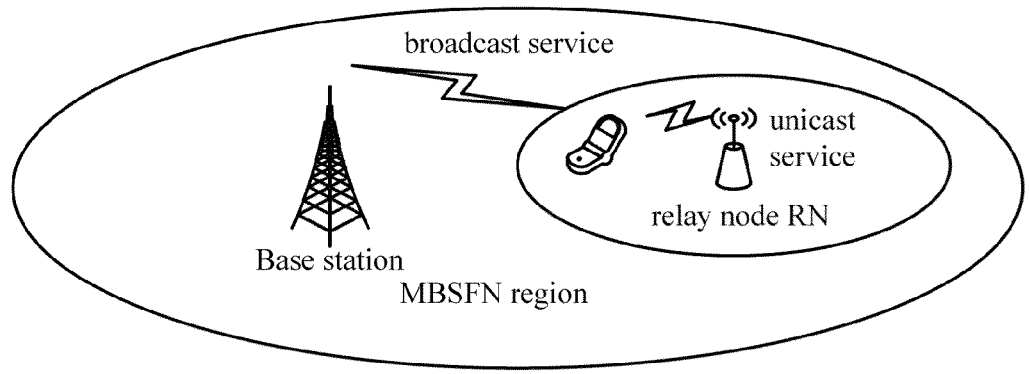
FIG. 2 is a structural schematic diagram of a Release 10 network in which a relay node is introduced in the prior art.
Figure 3:
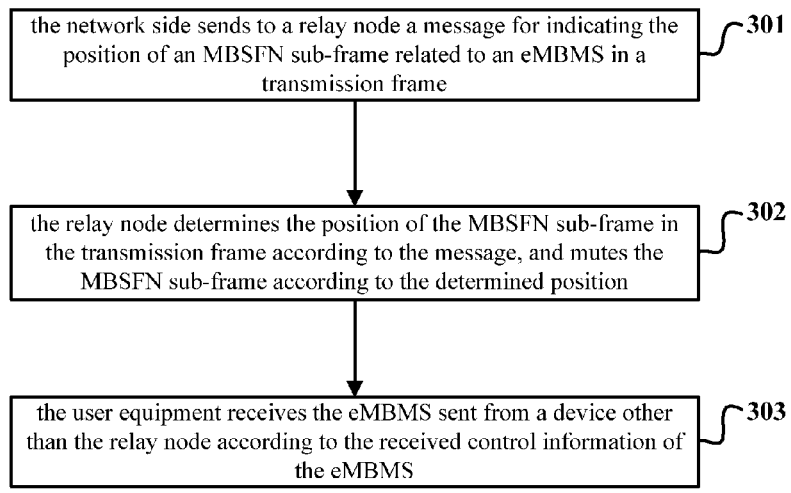
FIG. 3 is a flow chart of a method for supporting an eMBMS in a relay network provided by a first embodiment of the invention.

The first embodiment of the invention provides a method for supporting an enhanced multimedia broadcast multicast service, eMBMS, in a relay network, as shown in FIG. 3, and the method includes the following steps.

Step 301, sending, by a network-side, a message for indicating the position of a Multicast/Broadcast over Single Frequency Network, MBSFN, sub-frame related to the eMBMS in a transmission frame to a relay node.

Preferably, the message for indicating the position can be implemented by a dedicated signaling pre-configured between the network side and the relay node.

Step 302, determining, by the relay node, the position of the MBSFN sub-frame in the transmission frame according to the received message for indicating the position; and muting the MBSFN sub-frame according to the determined position. Particularly, the relay node can mute the MBSFN sub-frame by using any one of the following ways:

setting, by the relay node, the MBSFN sub-frame as a blank sub-frame; or
  setting, by the relay node, the MBSFN sub-frame as a blank MBSFN sub-frame; or
  carrying, by the relay node, control information of the corresponding enhanced multimedia broadcast multicast service in the MBSFN sub-frame.

Specifically, the blank MBSFN sub-frame can be fully used for transmitting PDCCH control signaling, the blank sub-frame can be fully used for transmitting the PDCCH control signaling and pilot, or the blank sub-frame does not transmit any information.

Step 303, receiving, by the user equipment, an eMBMS sent from a device other than the relay node according to the received control information of the eMBMS, after the user equipment confirms that there is an MBSFN sub-frame which is muted by the relay node in the transmission frame.

If the relay node sets the MBSFN sub-frame as the blank sub-frame, the user equipment receives the control information of the eMBMS sent from the device (such as an enhanced base station (eNB, enhanced Node-B)) other than the relay node, and acquires data information of the eMBMS according to the control information.

If the relay node forwards the control information of the eMBMS, the user equipment receives data information of an eMBMS sent from a device other than the relay node according to the control information of the eMBMS forwarded from the relay node.

If the relay node forwards a part of control information of the eMBMS, i.e. system information of the eMBMS, the user equipment acquires, according to the system information, multicast control channel information of an eMBMS sent from a device other than the relay node, obtains the control information of the eMBMS by combining the received system information and multicast control channel information, and receives data information of the eMBMS transmitted from the device other than the relay node.

The second embodiment of the invention provides a method for supporting an eMBMS in a relay network.

Figure 4:
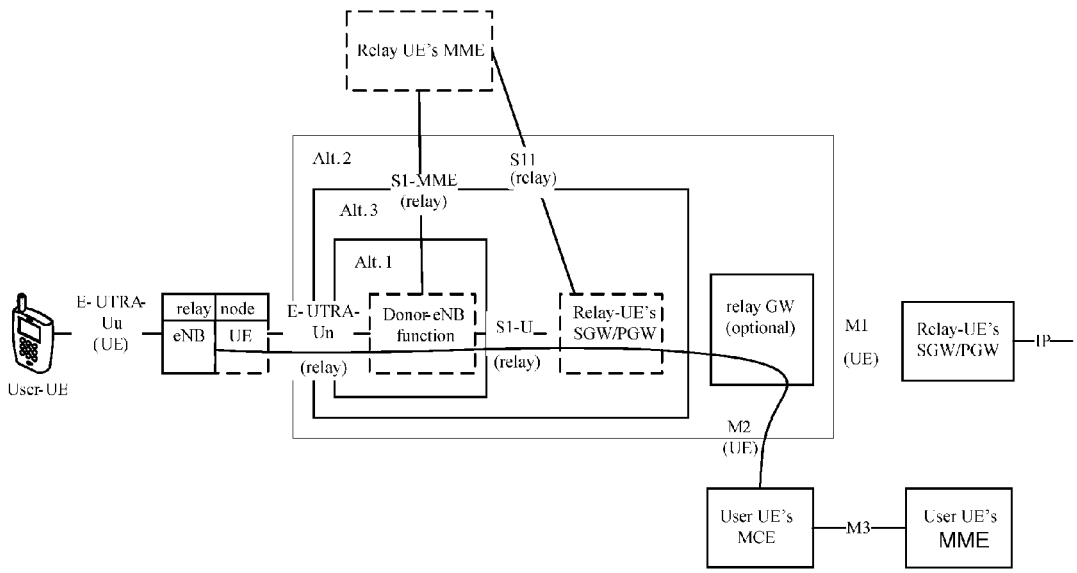
FIG. 4 and FIG. 5 are schematic diagrams of the eMBMS architecture provided by a second embodiment of the invention.
Figure 5:
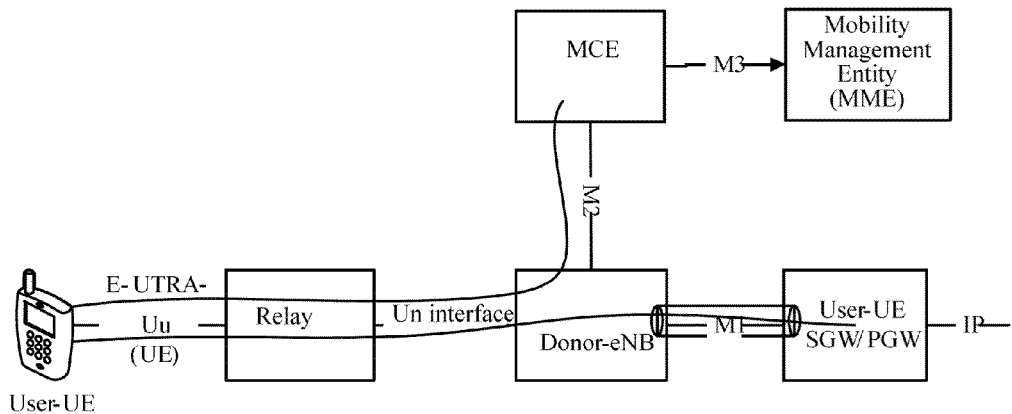

In the embodiment, if the return link of the RN is available, the corresponding control interface M2 and the user interface M1 can be extended to the RN, and transmit the eMBMS by partly using the previously method, as shown in FIG. 4 and FIG. 5. Particularly, the relay architecture shown in FIG. 4 includes some device, such as, Relay-UE's Mobility Management Entity (MME), User- UE's MBMS Control Entity (MCE) device, a base station Donor-eNB, a relay node, where the RN has a function similar to that of an enhanced base station (eNB, enhanced Node-B), and can directly interact the eMBMS information with the Donor-eNB (base station), and sends eMBMS data service to the user equipment. The relay architecture shown in FIG. 5 includes MCE, MME, Donor-eNB, RN, etc. where the RN can directly forward the received eMBMS.

Figure 6:
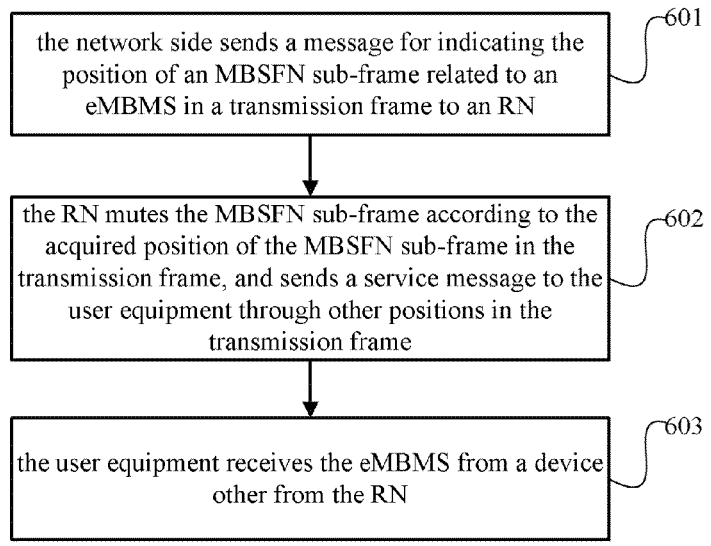
FIG. 6 is a flow chart of a method for supporting an eMBMS in a relay network provide by the second embodiment of the invention.

The method provided by the embodiments of the invention focuses on the case that the return link is unavailable, i.e. the case that the RN can not forward the eMBMS. As shown in FIG. 6, the method includes the following steps.

Step 601, sending, by the network-side, a message for indicating the position of the MBSFN sub-frame related to the eMBMS in the transmission frame to the RN.

Specifically, in the embodiment of the invention, a dedicated signaling is configured between the network side (such as, a base station) and the RN to transmit the message for indicating the position of the MBSFN sub-frame related to the eMBMS in the transmission frame. When sending a message related to the eMBMS to the RN, the network-side sends, through the dedicated signaling, the message for indicating the position of the MBSFN sub-frame related to the eMBMS in the transmission frame to the RN. The dedicated signaling can also carry control information of the eMBMS, such as the specific position of the data information of the eMBMS in the MBSFN sub-frame.

Step 602, determining, by the RN, the position of the MBSFN sub-frame in the transmission frame according to the received message, muting the MBSFN sub-frame according to the determined position information, and sending the eMBMS message to the user equipment on other positions of the transmission frame.

Specifically, the RN can acquire the position of the MBSFN sub-frame in the transmission frame by the dedicated signaling, and then set the sub-frame at the position as a blank sub-frame or a blank MBSFN sub-frame. If the blank sub-frame is set, the user equipment can not obtain any information from the sub-frame, therefore it will not affect the user equipment to acquire the eMBMS from other devices. If the blank MBSFN sub-frame is set, the user equipment can learn that this sub-frame is a sub-frame which is used to transmit the eMBMS information, but can not acquire any information from the blank MBSFN sub-frame.

If the RN can acquire eMBMS-related system information related to the eMBMS from the network side, the RN can also transmit to the user equipment the system information related to the eMBMS in the MBSFN sub-frame. Once acquiring the system information related to the eMBMS, the user equipment further acquires multicast control channel information related to the eMBMS from a device (e.g. a base station device) other than the RN, combines the system information related to the eMBMS and the multicast control channel information related to the eMBMS to obtain the control information of the eMBMS, and receives data information of the eMBMS sent from the device other than the RN according to the control information obtained by the combination.

If the RN can obtain the control information of the eMBMS from the network side, the RN can transmit the control information of the eMBMS to the user equipment in the MBSFN sub-frame. After receiving the control information of the eMBMS, the user equipment receives data information of the eMBMS sent from the device other than the RN directly according to the control information.

Step 603, receiving, by the user equipment, the eMBMS from the device other than the RN, when the user equipment confirms that there is the MBSFN sub-frame which is muted by the relay node in the transmission frame sent from the relay node.

Specifically, the user equipment is a subordinate user equipment of the RN.

If a blank sub-frame or a blank MBSFN sub-frame is carried at the position of the MBSFN sub-frame in the transmission frame sent to the user equipment from the RN, the user equipment can not obtain any information about the reception of the eMBMS from the sub-frame at this position. In this case, the user equipment can receive the control information and data information of the eMBMS from the device, such as eNB, other than the RN. Because the MBSFN sub-frame in the transmission frame sent by the RN is null, it will not affect the user terminal to receive the eMBMS information sent from the device, such as an eNB, and the user equipment can receive the eMBMS information normally.

If the MBSFN sub-frame carries the control information of the eMBMS at the RN, the user equipment can listen, according to the control information, data information of the eMBMS sent from a device, such as an eNB.

If the MBSFN sub-frame carries the system information related to the eMBMS at the RN, the user equipment can further receive multicast control channel information related to the eMBMS which is sent from other devices (such as an eNB) according to the system information, combine the system information related to the eMBMS with the multicast control channel information related to the eMBMS to obtain the control information of the eMBMS, and listen the data information of the eMBMS sent from the device such as an eNB according to the control information of the eMBMS. In this case, if the RN can also receive the control information of the eMBMS sent from the device such as an eNB, since the control information of the eMBMS sent from the RN is the same as that from the eNB, it will not influence on each other, and the signal strength of the control information of the eMBMS is improved after the combination, which is more conducive to the reception of the control information of the eMBMS by the user equipment. Further, the data information of the eMBMS is received according to the control information of the eMBMS.

Furthermore, in the embodiment of the invention, in order to ensure that the user equipment can receive the Multicast Control Channel (MCCH) information of the eMBMS, the network side (e.g an eNB) can also send MCCH configuration information (including sending position and/or repetition period of the MCCH) to the RN, and then RN forwards the MCCH configuration information to the user equipment. The user equipment receives the MCCH information of the eMBMS according to the MCCH configuration information. Particularly, the network side can send the MCCH configuration information to the RN through a dedicated control signaling. The RN can send the above configuration information to the user equipment through the dedicated control signaling or a system broadcast message.

By the above solution provided by the embodiment of the invention, the network side notifies the relay node of the position information of the MBSFN sub-frame related to the eMBMS in the transmission frame. The relay node mutes, according to the notified position information, the MBSFN sub-frame and transmits the transmission frame to the user equipment, so that the user equipment receives the eMBMS sent from a device other than the relay node, so as to avoid the impact of the relay node on the user equipment which supports the eMBMS and make the user equipment receive the eMBMS.

Figure 7:
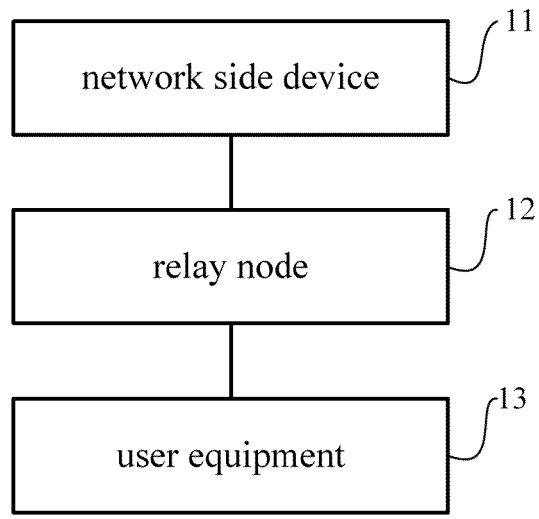
FIG. 7 is a structural schematic diagram of a system for supporting an eMBMS in a relay network provided by a third embodiment of the invention.

As shown in FIG. 7, a system for supporting an enhanced multimedia broadcast multicast service, eMBMS, in a relay network provided by the third embodiment of the invention includes: a network-side device 11, a relay node 12 and a user equipment 13, in which the network-side device 11 is configured to send to the relay node a message for indicating the position of an MBSFN sub-frame related to the eMBMS in a transmission frame;

the relay node 12 is configured to determine the position of the MBSFN sub-frame in the transmission frame according to the message sent from the network-side device 11, muting the MBSFN sub-frame according to the determined position information, and send an eMBMS message to the user equipment; and the user equipment 13 is configured to receive, according to the received control information of the eMBMS, the eMBMS sent from a device other than the relay node, when it is confirmed that there is the MBSFN sub-frame which is muted by the relay node in the transmission frame sent from the relay node.

Figure 8:
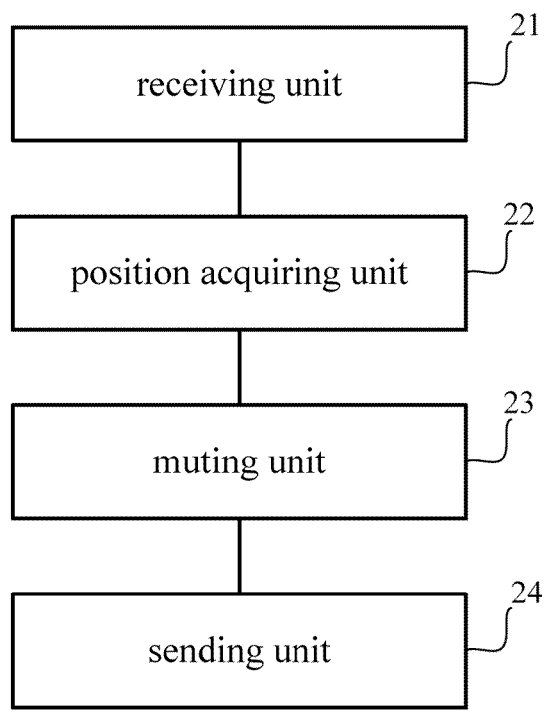
FIG. 8 is a structural schematic diagram of a relay node provided by a fourth embodiment of the invention.

As shown in FIG. 8, the fourth embodiment of the invention provides a relay node, which includes:

a receiving unit 21 configured to receive from the network side a message for indicating the position of an MBSFN sub-frame related to the eMBMS in a transmission frame;

a position acquiring unit 22 configured to acquire the information carried in the received message about the position of the MBSFN sub-frame related to the eMBMS in the transmission frame;

a muting unit 23 configured to muting the MBSFN sub-frame according to the acquired position of the MBSFN sub-frame in the transmission frame.

The relay node can also include:

a sending unit 24 configured to send an eMBMS message to the user equipment through other positions in the transmission frame, after the MBSFN sub-frame is muted.

The muting unit 23 can mute the MBSFN sub-frame by one of the following ways:

setting the MBSFN sub-frame as a blank sub-frame; or setting the MBSFN sub-frame as a blank MBSFN sub-frame; or carrying system information or control information of the corresponding eMBMS in the MBSFN sub-frame.

The receiving unit 21 is configured to receive a message for indicating the position of the MBSFN sub-frame in the transmission frame, which is sent from the network side through a configured dedicated signaling.

The receiving unit 21 is also configured to receive MCCH configuration information sent from the network side.

The sending unit 24 is also configured to send the MCCH configuration information to the user equipment.

The receiving unit 21 can receive the MCCH configuration information sent from the network side through the dedicated control signaling.

The sending unit 24 can also be configured to send the MCCH configuration information to the user equipment through the dedicated control signaling or a system broadcast message.

The MCCH configuration information can include but not limited to the sending position and/or repetition period of the MCCH.

Figure 9:
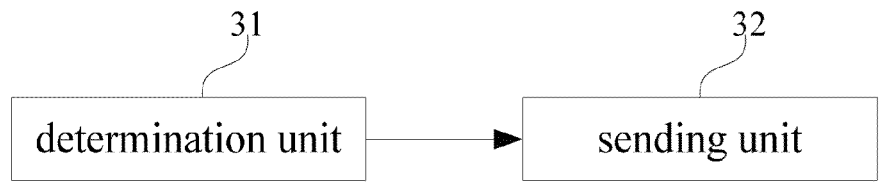
FIG. 9 is a structural schematic diagram of a base station provided by a fifth embodiment of the invention.

The fifth embodiment of the invention provides a base station device, as shown in FIG. 9, which includes:

a determination unit 31 configured to determine position information of the MBSFN sub-frame related to the eMBMS in the transmission frame; and a sending unit 32 configured to send to a relay node a message for indicating the position of the MBSFN sub-frame related to the eMBMS in the transmission frame, according to the determined position information. Specifically, the sending unit 32 can send to the relay node a message for indicating the position of the MBSFN sub-frame related to the eMBMS in the transmission frame, through a configured dedicated signaling.

Figure 10:
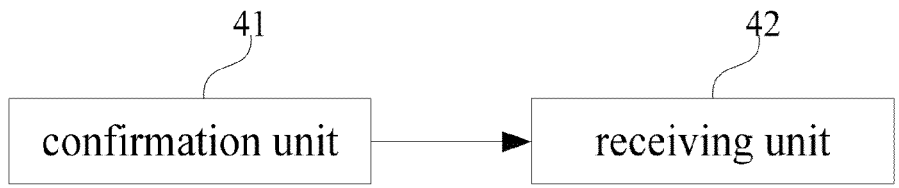
FIG. 10 is a structural schematic diagram of a user equipment provided by a sixth embodiment of the invention.

The sixth embodiment of the invention provides a user equipment as shown in FIG. 10, which includes:

a confirmation unit 41 configured to confirm whether there is an MBSFN sub-frame which is muted by the relay node in the transmission frame sent from the relay node;

a receiving unit 42 configured to receive, according to the received control information of the eMBMS, the eMBMS sent from a device other than the relay node if the confirmation unit 41 confirms the existence of the muted MBSFN sub-frame.

The receiving unit 42 can be specifically used to receive the system information of the eMBMS sent from the relay node, receive multicast control channel information of the eMBMS sent from the device other than the relay node, combine the system information and the multicast control channel information to obtain the control information of the eMBMS, and acquire data information of the eMBMS sent from the device other than the relay node according to the control information of the eMBMS obtained after combination.

The receiving unit 42 can also be specifically used to receive the control information of the eMBMS transmitted from the relay node, and directly acquire, according to the control information, the data information of the eMBMS sent from the device other than the relay node.

The receiving unit 42 can also be specifically used to receive the control information of the eMBMS sent from the device other than the relay node, and directly acquire, according to the control information, the data information of the eMBMS sent from the device other than the relay node.

Through the method, system and device provided by the embodiments of the invention, the network side notifies the relay node of the position of the MBSFN sub-frame related to the eMBMS in the transmission frame, and the relay node mutes the MBSFN sub-frame and sends the transmission frame to the user equipment, so that the user equipment receives the eMBMS sent from the device other than the relay node, so as to avoid the impact of the relay node on the user equipment which supports the eMBMS and make the user equipment receive the eMBMS successfully.

Figure 11:
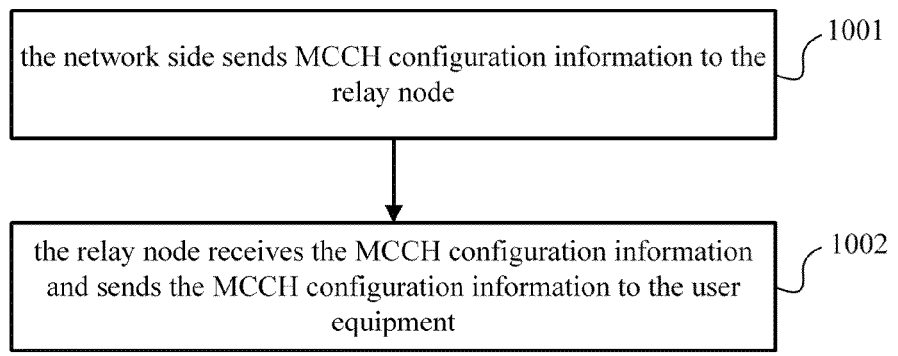
FIG. 11 is a flow chart of a method for supporting an eMBMS in a relay network provided by a seventh embodiment of the invention.

Furthermore, the seventh embodiment of the invention provides a method for supporting an eMBMS in a relay network, as shown in FIG. 11, and the method includes the following steps.

Step 1001, sending, by the network-side, MCCH configuration information to a relay node.

The network side can send the MCCH configuration information (including the sending position and/or repetition period of the MCCH) to the relay node through a dedicated control signaling. The control signaling may be Radio Resource Control (RRC) layer signaling (e.g. RRC reconfiguration signaling), and can also be other dedicated control signaling (such as the MAC layer signaling). In particular, the configuration information can be part or all of the information of the mcch-Config-r9 message in a LTE R9 system.

Step 1002, receiving, by the relay node, the MCCH configuration information, and sending the MCCH configuration information to the user equipment.

The relay node can send the MCCH configuration information to the user equipment through the dedicated control signaling (e.g. RRC reconfiguration signaling) or a system broadcast message (e.g. SIB 13).

Specifically, the relay node can also send reception confirming information to the network side after receiving the MCCH configuration information. Similarly, the user equipment can also send reception confirming information to the relay node after receiving the MCCH configuration information.

By the solution provided by the embodiment of the invention, the network side sends the MCCH configuration information to the relay node, and then the MCCH configuration information is forwarded to the user equipment by the relay node. The user equipment can learn related configuration parameters and the position information of the MCCH according to the MCCH configuration information, thus receiving accurately the MCCH information of the eMBMS according to the MCCH configuration information. When the network side changes the position or some parameters (such as MCS) of the MCCH, the user equipment can acquire a new position of the MCCH timely, so as to receive the eMBMS accurately without affecting the function of the eMBMS of the user equipment.

Based on the same technical idea as the seventh embodiment, the eighth embodiment of the invention provides a system for supporting an eMBMS in a relay network, which includes a network side device, a relay node and a user equipment, where the network side device is configured to send MCCH configuration information to the relay node; and the relay node is configured to receive the MCCH configuration information and send the MCCH configuration information to the user equipment.

Based on the same technical idea as that of the seventh embodiment, the ninth embodiment of the invention provides a relay node, including:

a receiving unit configured to receive MCCH configuration information sent from the network side; and a sending unit configured to send the MCCH configuration information to the user equipment.

Specifically, the receiving unit receives the MCCH configuration information sent from the network side through a dedicated control signaling.

Specifically, the sending unit sends the MCCH configuration information to the user equipment through the dedicated control signaling or a system broadcast message.

The sending configuration information includes a sending position and/or repetition period of the MCCH.

Through the above system and relay node provided by the embodiment of the invention, the network side sends the MCCH configuration information to the relay node, and then the MCCH configuration information is forwarded to the user equipment by the relay node, so that the user equipment can receive accurately the MCCH information of the eMBMS at the position and time of sending the MCCH according to the MCCH configuration information.

On the other hand, When the RN is introduced in the LTE system, for notification signaling transmission related to the MBMS, there are the following requirements.

In the case that the RN supports the MBMS transmission, the RN should notify timely the UE of the MCCH modification notification information related to the MBMS transmission, so that the UE receives the updated content of the MCCH timely, so as to ensure the UE the reception of the MBMS-related information.

In the case that RN does not support the MBMS transmission, the characteristics of the network still needs to be transmitted by the MBSFN, so that the transmission information of the MBMS of other cells can be received by the UE. Therefore, it needs to establish signaling transmission mechanism to enable the UE to learn the MCCH modification notification from the network side timely.

In order to satisfy the requirements of sending the MCCH modification notification information in the above relay network, the embodiment of the invention provides a following corresponding solution.

In the case that the RN supports the MBMS transmission, in the embodiment of the invention, the RN obtains a configuration information for MCCH modification notification and the MCCH modification notification information from the DeNB before a certain sending time for sending the MCCH modification notification information, and notifies the UE of the configuration information for MCCH modification notification. When the sending time of the MCCH modification notification information arrives, the RN and the DeNB synchronistically send the MCCH modification notification information by using the MBSFN mode. Specifically, the configuration information for MCCH modification notification includes: sending position information corresponding to the MCCH modification notification information, and the relevant parameters includes: the number of repetitions of sending MCCH modification notification, offset of sending the notification information, and specific sub-frame of sending notification information. The specific implementation of the solution is described in detail hereinafter by the first embodiment.

In the case that the RN does not support the MBMS transmission, in the embodiment of the invention, the RN obtains the MCCH modification notification information from the DeNB before the next MCCH modification boundary, and then sends the obtained MCCH modification notification information to the UE through a downlink control signaling. The specific implementation of the solution is described hereinafter by the second embodiment and the third embodiment.

In the embodiment of the invention, the configuration information for MCCH modification notification can be used to indicate the specific sending position of the MCCH modification notification information and can also include the minimum number of times that the UE and/or RN attempts to receive the MCCH modification notification information when the UE and/or RN does not detect the MCCH modification notification information successfully in an MCCH modification period. In addition, the configuration information for MCCH modification notification can also be used to indicate the UE to read the updated MCCH content at the next MCCH modification boundary, and can include some information, such as, MBMS information, radio resource allocation relevant information. The MCCH modification notification information can be used to indicate the UE that the MCCH of which MBSFN region has changed.

The technical solutions in the invention will be described clearly and fully hereinafter in conjunction with the drawings of the invention, apparently, the embodiments of the invention are only a part of the embodiments of the invention, rather than all the embodiments. All other embodiments obtained based on the embodiments of the invention by those skilled in the art without any creative work belong to the scope of protection of the invention.

Tenth Embodiment

Figure 12:
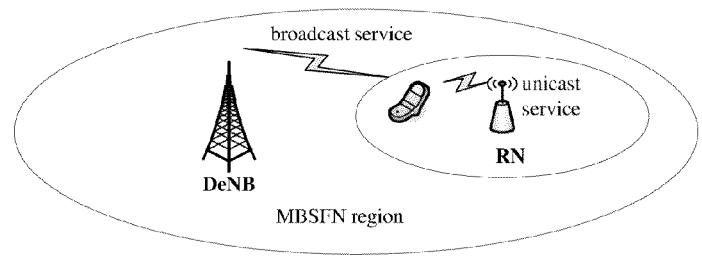
FIG. 12 is a schematic diagram of the architecture of a Release 10 network in which a relay node is introduced in the prior art.

As shown in FIG. 12, the network architecture involved in the embodiment can include a donor base station (DeNB) and an RN, where the RN supports the MBMS transmission. In this situation, in this embodiment, the RN can receive, from the DeNB, the configuration information for MCCH modification notification and the MCCH modification notification information in advance, and send the configuration information for MCCH modification notification to the UE. When the sending time of the MCCH modification notification information defined by the DeNB arrives, the RN and the base station send the MCCH modification notification information synchronistically, so as to ensure that the UE can read the updated MCCH content at the next MCCH modification boundary according to the MCCH modification notification information, in which the updated MCCH content includes some information, such as MBMS information, radio resource allocation relevant information. Thus, the MBMS is correctly received.

Figure 13:
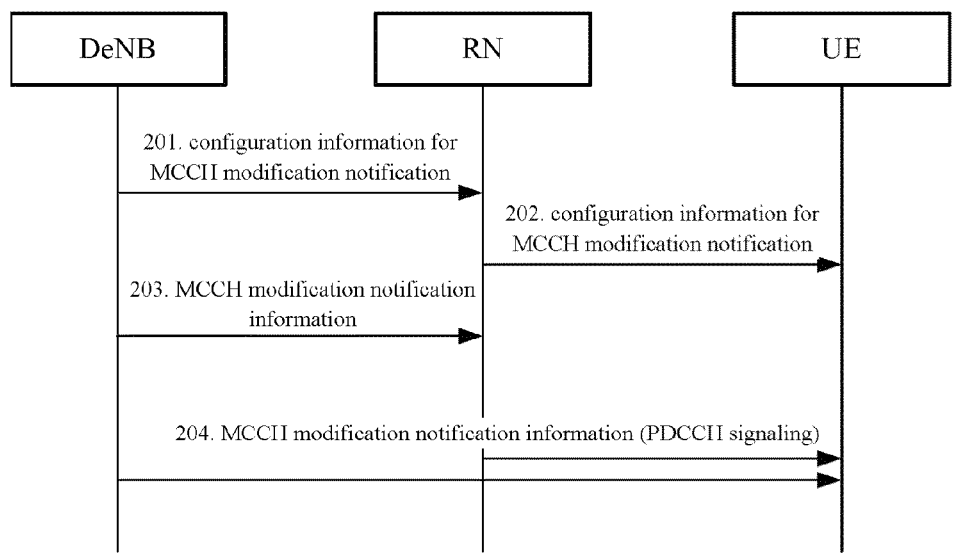
FIG. 13 is a schematic diagram of a process of sending MCCH modification notification information provided by a tenth embodiment of the invention.

As shown in FIG. 13, the process of the embodiment of the invention can include the following steps.

Step 201, receiving, by the RN, the configuration information for MCCH modification notification from the DeNB.

In this step, the DeNB can send downlink control information according to the system engagement, in which the configuration information for MCCH modification notification is carried in the downlink control information. In this way, the RN can obtain the configuration information for MCCH modification notification by listening and receiving the downlink control information. Specifically, the time for the DeNB sending the configuration information and the time for the RN receiving the configuration information can be specified by the system or the standard. The sending time of the configuration information for MCCH modification notification specified by the system or the standard should ensure that the RN or UE can receive the configuration information for MCCH modification notification before receiving the MCCH modification notification information.

Step 202, sending, by the RN, the configuration information for MCCH modification notification to the UE.

In this step, the RN can send to the UE the configuration information for MCCH modification notification carried in downlink control signaling. The downlink control signaling may be Physical Downlink Control Channel (PDCCH) signaling, Media Access Control (MAC) layer signaling, Radio Resource Control (RRC) layer signaling or other control signaling which can carry the configuration information for MCCH modification notification.

Step 203, receiving, by the RN, the MCCH modification notification information from the DeNB.

In this step, the time for the RN receiving the MCCH modification notification information can be specified by the system or standard.

Step 204, sending, by the RN, the MCCH modification notification information at the sending time of the MCCH modification notification information specified by the DeNB.

Since the RN sends the MCCH modification notification information at the sending time of the MCCH modification notification information specified by the DeNB, the DeNB also sends the MCCH modification notification information simultaneously, and there is a mechanism which can ensure the RN or the UE to receive the notification information before the MCCH modification boundary arrives, the RN and the DeNB can send the MCCH modification notification information synchronistically, and it can ensure the UE to receive the notification information sent from the RN before the MCCH modification boundary arrives.

After receiving the MCCH modification notification information according to the received configuration information for MCCH modification notification, the UE reads the updated MCCH content at the next MCCH modification boundary, where the updated MCCH content includes information, such as the modified eMBMS information and radio resource allocation relevant information. Therefore, the MBMS can be received according to the modified eMBMS information and the radio resource allocation relevant information.

In the above process, as for the timing of the DeNB sending the configuration information for MCCH modification notification and the MCCH modification notification information, in general, since the configuration information for MCCH modification notification belongs to semi-static information and the MCCH modification notification information may be changed in each period, the configuration information for MCCH modification notification is sent firstly, and then the MCCH modification notification information is sent.

In the above process, since the RN supports the MBMS transmission, the RN can receive the MCCH modification notification information sent from the base station through the downlink control signaling of the base station, and send the received MCCH modification notification information to the UE. Specifically, the DeNB can send to the RN the MCCH modification notification information carried in the downlink control signaling (such as PDCCH signaling), and the RN can also send the MCCH modification notification information to the UE by carrying the MCCH modification notification information in the downlink control signaling (such as PDCCH signaling) which is sent from the RN to the UE.

Based on the same technical idea as the above embodiment, the embodiment of the invention also provides an RN device.

Figure 14:
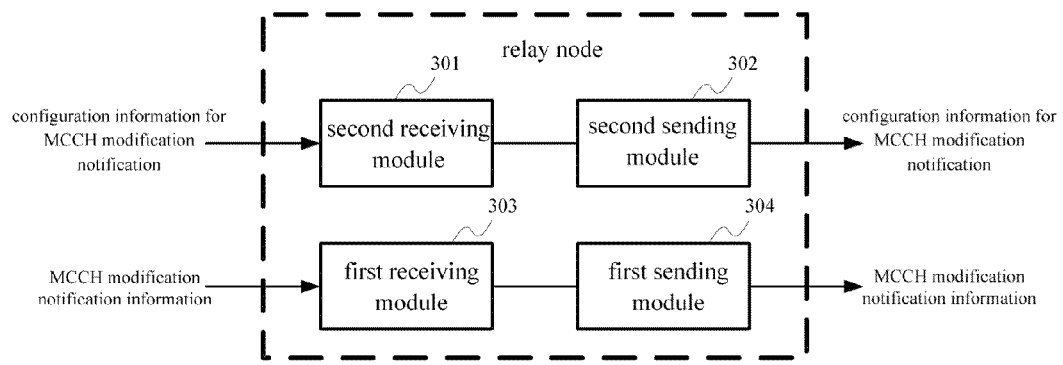
FIG. 14 is a structural schematic diagram of an RN device operating the process shown in FIG. 13.

As shown in FIG. 14, the RN device can include: a second receiving module 301, a second sending module 302, a first receiving module 303 and a first sending module 304, where the second receiving module 301 is configured to receive the configuration information for MCCH modification notification from the base station; by receiving the downlink control signaling sent from the base station, this module can receive the configuration information for MCCH modification notification carried in the downlink control signaling;

the second sending module 302 is configured to send the configuration information for MCCH modification notification received by the second receiving module 301 to the user equipment; this module can send the configuration information for MCCH modification notification through the downlink control signaling;

the first receiving module 303 is configured to receive the MCCH modification notification information from the base station;

the first sending module 304 is configured to send the MCCH modification notification information received by the first receiving module 303 to the user equipment.

The module can send the MCCH modification notification information at the same time when the base station sends the MCCH modification notification information, that is, the module and the base station send the MCCH modification notification information synchronistically.

The second receiving module 301 can receive the configuration information for MCCH modification notification from the base station according to the time specified by the system or the standard; the first receiving module 303 can receive the MCCH modification notification information from the base station according to the time specified by the system or the standard.

The first receiving module 303 can receive the MCCH modification notification information by receiving from the base station the downlink control signaling which carries the MCCH modification notification information; the first sending module 304 can send to the user equipment the MCCH modification notification information carried in the PDCCH signaling.

It can be seen from the above descriptions that, in the case that the RN supports MBMS transmission, the RN acquires the MCCH modification notification information and the MCCH notification sending configuration information before the specified sending time of the MCCH modification notification information, and sends the configuration information to the UE. In this way, when the sending time of the MCCH modification notification information specified by the DeNB arrives, the RN and the DeNB send the MCCH modification notification information synchronistically by using an MBSFN transmission mode, so that the UE can read, according to the MCCH modification notification information, the updated MCCH content at the next MCCH modification boundary, where the updated MCCH content includes MBMS information and radio resource allocation relevant information. Therefore, according to the above description, the RN can send the MCCH modification notification information related to the MBMS transmission to the UE timely, so that the UE can receive the updated content of the MCCH timely, thus ensuring the reception of the MBMS-related information of the UE.

Eleventh Embodiment

As shown in FIG. 12, the network architecture involved in the embodiment includes a donor base station (DeNB) and an RN, where the RN does not support the MBMS transmission. In view of this situation, in this embodiment, the RN can receive the MCCH modification notification information from the DeNB before the MCCH modification boundary and send the MCCH modification notification information to the UE before the MCCH modification boundary, so as to ensure that the UE can receive the MCCH modification notification information timely to read the updated MCCH content at the next MCCH modification boundary, where the updated MCCH content includes MBMS information and radio resource allocation relevant information.

Figure 15:
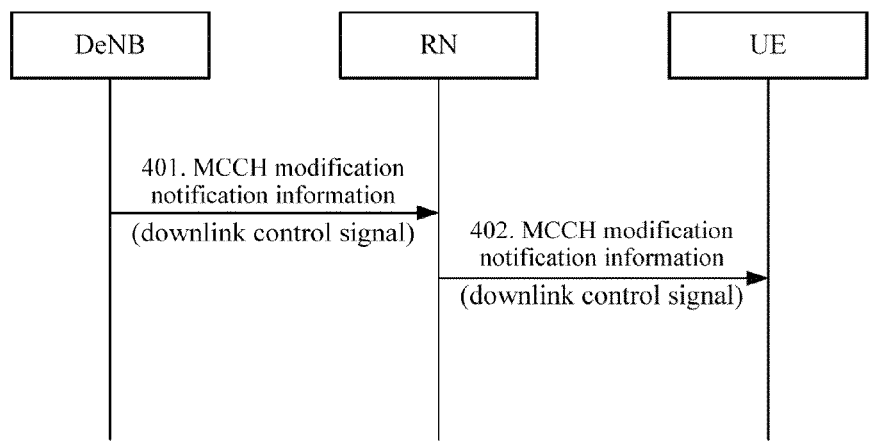
FIG. 15 is a schematic diagram of a process of sending MCCH modification notification information provided by an eleventh embodiment of the invention.

As shown in FIG. 15, the process of the embodiment of the invention can include:

Step 401, receiving, by the RN, the MCCH modification notification information from the DeNB. Optionally, the RN can return confirming information to the DeNB after receiving the MCCH modification notification information.

In this step, the DeNB can send the MCCH modification notification information to the RN by carrying the MCCH modification notification information in downlink control signaling. The downlink control signaling can be a dedicated control signaling or a public control signaling, and the carrying mode of the signaling can be PDCCH signaling, an MAC layer signaling, a RRC layer signaling, or other control signaling which can carry the MCCH modification notification information.

Step 402, sending, by the RN, the MCCH modification notification information previously received from the DeNB to the UE before the MCCH modification boundary (i.e. before the end of the current MCCH modification period, in other words, before the begin of the next MCCH modification period), so that the UE do not have to receive the notification information at the sending time of the MCCH modification notification information specified by the DeNB.

In this step, the RN can send the MCCH modification notification information to the UE by carrying it in downlink control signaling. The downlink control signaling can be a dedicated control signaling or a public control signaling, and the carrying mode of the signaling can be a PDCCH signaling, an MAC layer signaling, a RRC layer signaling, or other control signaling which can carry the MCCH modification notification information.

After receiving the MCCH modification notification information, the UE reads the updated MCCH content at the subsequent MCCH modification boundary, i.e. the next MCCH modification boundary, so as to receive the MBMS according to the modified eMBMS information and radio carrying related information, where the updated MCCH content includes some information, such as the MBMS information and the radio resource allocation relevant information.

In general, the MCCH information is periodically sent at a repetition period in a MCCH modification cycle and the same content is sent repeatedly, such as, sending the MCCH modification notification twice in 512 ms and sending the updated MCCH modification notification twice in the subsequent 512 ms. In this situation, it can also be considered that the beginning moment of the period for sending the updated MCCH modification notification information is the MCCH modification boundary, or the beginning moment of the period for sending the MCCH modification notification information having different content from the pervious content is the MCCH modification boundary.

In the above process, since the RN does not support the MBMS transmission, in accordance with existing protocol, the RN can not receive the MCCH modification notification information from the DeNB and send it to the UE by means of the MBSFN sub-frame. Therefore, in this embodiment, the DeNB can send the MCCH modification notification information to the RN by carrying it in a downlink control signaling which may be a public control signaling or a dedicated control signaling. In addition, the RN can also send the MCCH modification notification information to the UE by carrying it in the downlink control signaling which may be the public control signaling or the dedicated control signaling.

Similar to the first embodiment, the time for the DeNB sending the configuration information for MCCH modification notification can be specified by the system or the standard. It should ensure that the RN or the UE can receive the configuration information for MCCH modification notification before the corresponding MCCH modification boundary (taking into account appropriate transmission delay). Therefore, after receiving related information from the DeNB, the RN sends the related information to the UE, which can also ensure that the UE can receive the related information before the corresponding MCCH modification boundary.

Based on the same technical idea, the embodiment of the invention also provides an RN device.

Figure 16:
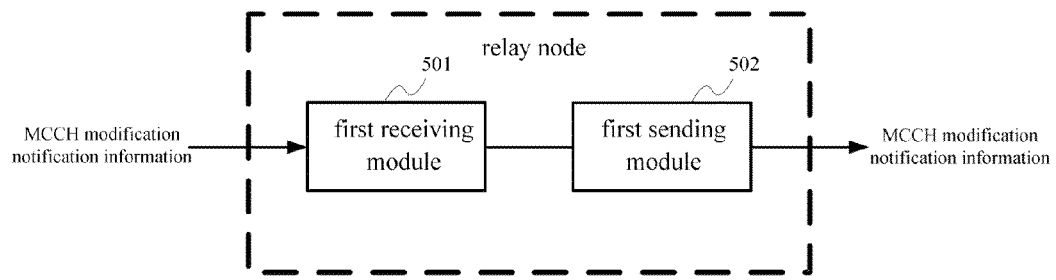
FIG. 16 is a structural schematic diagram of an RN device operating the process shown in FIG. 15.

As shown in FIG. 16, the RN device can include a first receiving module 501 and a first sending module 502, where the first receiving module 501 is configured to receive the MCCH modification notification information from the base station; the module can receive the MCCH modification notification information carried in the downlink control signaling sent from the base station; and the first sending module 502 is configured to send to the user equipment the MCCH modification notification information received by the first receiving module 501. The module can send the MCCH modification notification information received from the base station to the user equipment before the modification boundary corresponding to the MCCH modification notification information, and the module can send the MCCH modification notification information through the downlink control signaling.

It can be seen that from the above description that, in the case that the RN does not support the MBMS transmission, the RN acquires the MCCH modification notification information before the MCCH modification boundary and sends the acquired MCCH modification notification information to the UE through the downlink control signaling before the MCCH modification boundary, so that the UE can timely read the updated MCCH content at the next modification boundary according to the MCCH modification notification information, where the updated MCCH content includes MBMS information and radio carrying related information. Therefore, according to the above description, the RN can timely send the MCCH modification notification information related to the MBMS transmission to the UE, so that the UE can timely receive the updated content of the MCCH, thus ensuring the reception of the MBMS related information by the UE.

Twelfth Embodiment

As shown in FIG. 12, the network architecture involved in the embodiment includes a donor base station (DeNB) and an RN, where the RN does not support the MBMS transmission. In view of this situation, in this embodiment, the RN can listen the MCCH modification notification information sent from the DeNB at the moment when the DeNB sends the MCCH modification notification information, and send the detected MCCH modification notification information to the UE, so as to ensure that the UE can receive the MCCH modification notification information timely so as to read the updated MCCH content including some information, such as MBMS information and radio resource allocation relevant information, at the next MCCH modification boundary according to the modification notification information, in order to correctly receive the MBMS.

Figure 17:
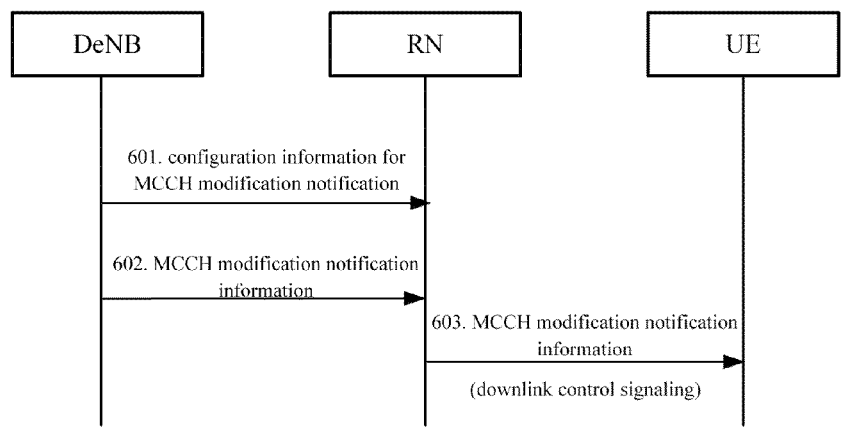
FIG. 17 is a schematic diagram of a process of sending MCCH modification notification information provided by a twelfth embodiment of the invention.

As shown in FIG. 17, the process of the embodiment of the invention can include the following steps.

Step 601, receiving, by the RN, the MCCH modification configuration sending configuration information from the DeNB. Specifically, the configuration information for MCCH modification notification can be carried in a downlink control signaling.

Step 602, listening, by the RN, the MCCH modification notification information sent from the DeNB at a corresponding position according to the received configuration information for MCCH modification notification at the moment when the DeNB sends the modification notification information. Optionally, the RN can return a confirming information to the DeNB after receiving the MCCH modification notification information.

Step 603, sending, by the RN, the MCCH modification notification information previously received from the DeNB to the UE after listening the MCCH modification notification information and before the next MCCH modification boundary, so that the UE do not have to receive the notification information at the sending time of the MCCH modification notification information specified by the DeNB.

In this step, if the MBMS information and the radio resource allocation relevant information are not changed, it is possible that the DeNB does not send the MCCH modification notification information at the specified sending time of the MCCH modification notification information, so that the RN cant not listen the MCCH modification notification information, and does not send the MCCH modification notification information to the UE.

In this step, the RN can send the MCCH modification notification information carried in the public or dedicated control signaling. The control signaling can be a PDCCH signaling, an MAC layer signaling, a RRC layer signaling or other control signaling which can carry the MCCH modification notification information.

After receiving the MCCH modification notification information, the UE reads the updated MCCH content which includes MBMS information and radio resource allocation relevant information at the subsequent MCCH modification boundary, i.e. the next MCCH modification boundary, so as to receive the MBMS according to the modified eMBMS information and the radio carrying related information.

In the above process, the time for the RN receiving the MCCH modification notification information can be specified by the system or the standard. Preferably, the time is the time for the DeNB sending the MCCH modification notification information or a sending time specified by other system. Specifically, the time for the DeNB sending the MCCH modification notification information should be between the MCCH modification boundaries.

In the above process, the RN can send to the UE the MCCH modification notification information carried in the public or dedicated control signaling.

Based on the same technical idea, the embodiment of the invention also provides an RN device.

Figure 18:
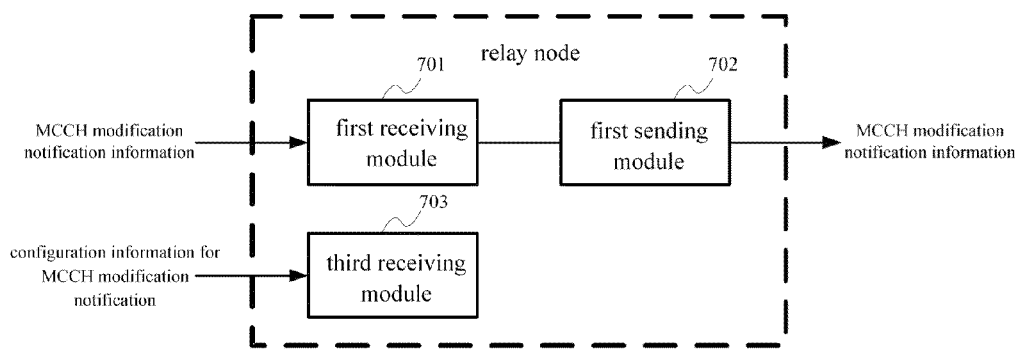
FIG. 18 is a structural schematic diagram of an RN device operating the process shown in FIG. 17.

As shown in FIG. 18, the RN device can include a first receiving module 701 and a first sending module 702, where the first receiving module 701 is configured to receive the MCCH modification notification information from the base station;

the first sending module 702 is configured to send to the user equipment the MCCH modification notification information received by the first receiving module 701. The module can send the MCCH modification notification information before the MCCH modification boundary, and MCCH modification notification information can be sent through the downlink control signaling.

The RN device can also include a third receiving module 703 configured to receive the configuration information for MCCH modification notification from the base station so that the first receiving module 701 can receive the MCCH modification notification information at a corresponding position according to the configuration information.

It can be seen that from the above descriptions that, in the case that the RN does not support the MBMS transmission, before the MCCH modification boundary, the RN sends to the UE the MCCH modification notification information received when the DeNB sends the MCCH modification notification information, so that the UE can timely read the updated content which includes MBMS information and the radio carrying related information at the next modification boundary according to the MCCH modification notification information. Therefore, according to the above description, the RN can send to the UE the MCCH modification notification information related to the MBMS transmission timely, so that the UE can timely receive the updated MCCH content, thus ensuring the reception of the MBMS related information by the UE.

Thirteenth Embodiment

In the embodiment, the RN can send to the UE the configuration information for MCCH modification notification received from the DeNB. Thus, in the case that the UE does not receive the configuration information for MCCH modification notification sent from a cell other than the cell where the RN is located, the UE can read the modified MCCH content which includes MBMS information and radio resource allocation relevant information, according to the configuration information for MCCH modification notification sent from the RN, thus ensuring the reception of the MBMS related information by the user equipment.

Figure 19:
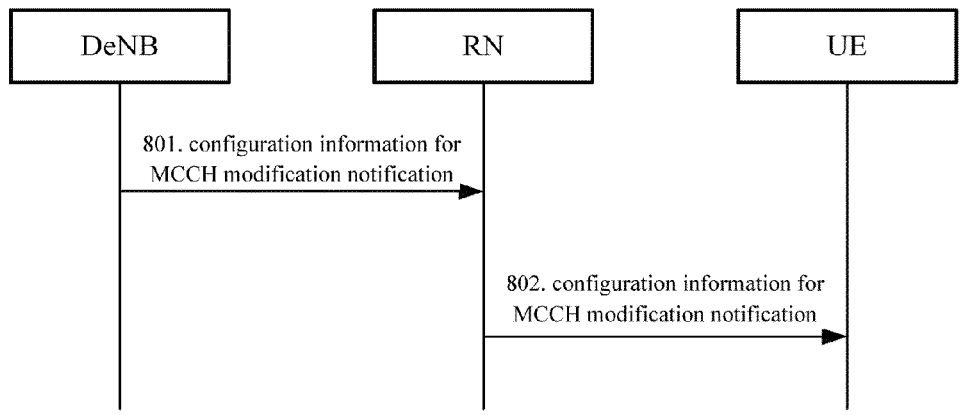
FIG. 19 is a schematic diagram of a process of sending MCCH modification notification information sending configuration information provided by a thirteenth embodiment of the invention.

As shown in FIG. 19, the process of the embodiment can include the following steps.

Step 801, receiving, by the RN, the configuration information for MCCH modification notification sent from the DeNB.

In this step, the DeNB can send the configuration information for MCCH modification notification by carrying the configuration information for MCCH modification notification in a downlink control signaling, and the RN can receive the configuration information for MCCH modification notification by receiving the downlink control signaling for carrying the configuration information for MCCH modification notification which is sent from the DeNB.

Step 802, sending, by the RN, the received configuration information for MCCH modification notification to the UE.

In this step, the RN can send the configuration information for MCCH modification notification to the UE by carrying the configuration information for MCCH modification notification in the downlink control signaling.

The downlink control signaling in the above process can be the dedicated control signaling, such as the PDCCH signaling, the MAC layer signaling or the RRC layer signaling; and the downlink control signaling can also be public control signaling.

Based on the same technical idea, the embodiment of the invention also provides a relay node device.

Figure 20:
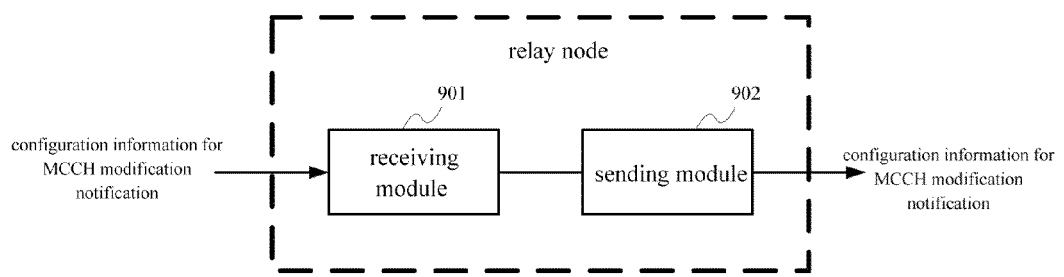
FIG. 20 is a structural schematic diagram of an RN device operating the process shown in FIG. 19.

As shown in FIG. 20, the relay node device can include a receiving module 901 and a sending module 902, where the receiving module 901 is configured to receive the configuration information for MCCH modification notification sent from the base station; the module can receive the configuration information for MCCH modification notification by receiving the downlink control signaling for carrying the configuration information for MCCH modification notification which is sent from the base station; and the sending module 902 is configured to send to the user equipment the configuration information for MCCH modification notification received by the receiving module 901. The module can send the configuration information for MCCH modification notification by carrying the configuration information for MCCH modification notification in the downlink control signaling.

Fourteenth Embodiment

Figure 21:
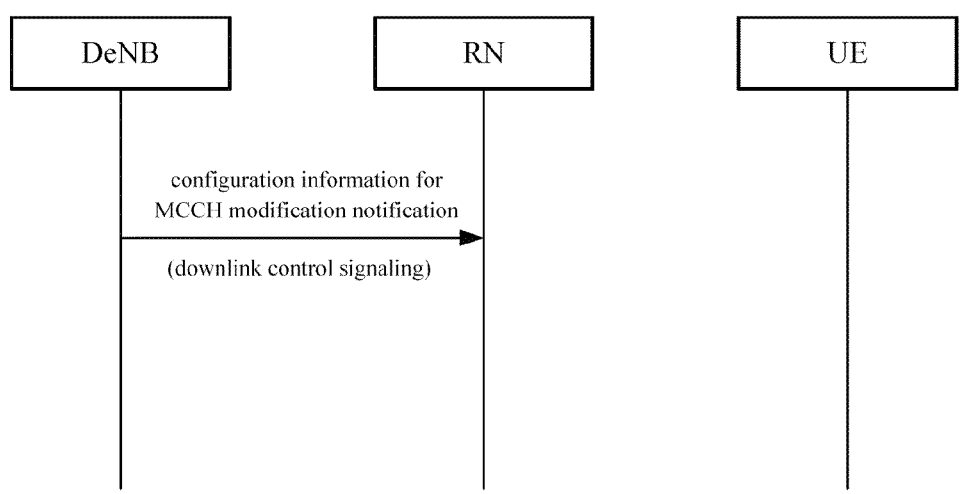
FIG. 21 is a schematic diagram of a process of sending MCCH modification notification information sending configuration information provided by a fourteenth embodiment of the invention.

The invention also provides another embodiment in which the RN does not support the MBMS transmission. That is to say, the base station transmits the configuration information for MCCH modification notification to the RN, rather than the UE, as shown in FIG. 21. In this way, the RN does not need to notify the UE through signaling, which reduces the overhead of the interface (interface Uu) between the RN and the UE. In this embodiment, in order to eliminate the possible interference introduced in the MBSFN sub-frame of transmitting the MBMS (the interference to the UE which is receiving the MBMS), the RN can set the Orthogonal Frequency Division Multiplexing (OFDM) symbol of transmission data information in the corresponding MBSFN sub-frame (i.e. the sending position of MCCH modification notification information indicated by configuration information for MCCH modification notification) as "Mute", i.e. not scheduling the user, so as to not transmit any user data information. It can also choose to send or not send any pilot information. Thus, although the UE does not know that these sub-frames are MBSFN sub-frames and the UE will receive the service by taking the sub-frame as a regular unicast sub-frame, due to the RN operates the above processing, the UE will not receive the scheduling information itself and user data, and thus reducing the introduced interference and the impact on the UE in a certain extent.

Based on the above same technical idea as that of the process, the embodiment of the invention also provides an RN device including a first receiving module, and the RN device can further include a setting module, where the first receiving module is configured to receive the configuration information for MCCH modification notification from the base station; and the setting module is configured to set the OFDM symbol of transmission data in the MBSFN sub-frame for sending the MCCH modification notification information which is indicated by the MCCH modification information sending configuration information received by the first receiving module as mute.

It should be noted that, the downlink control signaling in the above embodiments of the invention can be a dedicated control signaling or a public control signaling.

It should also be noted that, in the above embodiments of the invention, if the MBMS information and the radio resource allocation relevant information are not be changed, it is possible that the DeNB does not send the MCCH modification notification information at the specified occurrence time of the MCCH modification notification information, so that the RN can not listen the MCCH modification notification information, and also the RN will not send the MCCH modification notification information to the UE.

By the above descriptions of the embodiments, it will be apparent for those skilled in the art that, the invention can be implemented by means of the combination of software and a necessary general hardware platform, of course, it can also be implemented by hardware, but the former is a preferred embodiment in many cases. Based on this understanding, the part of the technical solution of the invention which contributes to the prior art is essentially embodied in the form of a software product, and the computer software product is stored in a storage medium and includes multiple instructions so that a computer equipment (such as personal computers, servers, network equipments) can execute the method described by the embodiments of the invention.

It should be understood by those skilled in the art that, the drawings are only schematic diagrams of a preferable embodiment, and the modules or processes in the drawings are not necessary for the embodiments of the invention.

It should be understood by those skilled in the art that, the modules in the device in the embodiments can be arranged in the device in the embodiment according to the descriptions of the embodiments, or appropriate changes can be made to the embodiment, for example, the modules in the device can be arranged in one or more devices different from that in the embodiment. The muddles in the embodiment can be integrated into one module or can be further divided into multiple modules.

The reference numerals in the above embodiments of the invention are only for description, without indicating the superiority and inferiority of the embodiments.

The above-disclosed is only several specific embodiments of the invention and is not intended to limit the invention. Any variations that can be conceived by those skilled in the art should fall into the scope of protection of the invention.

The invention claimed is:

1. A method for supporting an enhanced multimedia broadcast multicast service, eMBMS, in a relay network, comprising:

receiving, by a relay node, a message for indicating a position of an Multicast/Broadcast over Single Frequency Network, MBSFN, sub-frame related to the eMBMS in a transmission frame, which is sent from a network-side device;

acquiring, by the relay node, the position of the MBSFN sub-frame in the transmission frame according to the received message; and muting, by the relay node, the MBSFN sub-frame according to the determined position of the MBSFN sub-frame in the transmission frame;

determining, by a user equipment, whether there is the MBSFN sub-frame muted by the relay node in the transmission frame sent from the relay node; and receiving, by the user equipment, an eMBMS sent from a device other than the relay node according to a received control information of the eMBMS in the case that the user equipment determines that there is the muted MBSFN sub-frame.

2. The method according to claim 1, wherein the muting the MBSFN sub-frame by the relay node comprises:

setting, by the relay node, the MBSFN sub-frame as a blank sub-frame, wherein the blank sub-frame is fully used to transmit a PDCCH control signaling and a pilot, or the blank sub-frame does not transmit any information; or setting, by the relay node, the MBSFN sub-frame as a blank MBSFN sub-frame, wherein the blank MBSFN sub-frame is fully used to transmit the PDCCH control signaling; or carrying, by the relay node, control information of the eMBMS in the MBSFN sub-frame.

3. The method according to claim 1, further comprising:
receiving, by the relay node, MCCH configuration information from the network-side device; and
sending, by the relay node, the MCCH configuration information to a user equipment.

4. The method according to claim 3, wherein the method further comprising:
receiving, by a relay node, MCCH modification notification information from a base station; and
sending the MCCH modification notification information to a user equipment.

5. The method according to claim 4, wherein the relay node receives the MCCH modification notification information before an MCCH modification boundary corresponding to the MCCH modification notification information, and sends the MCCH modification notification information to the use equipment before the MCCH modification boundary corresponding to the MCCH modification notification information.

6. The method according to claim 5, wherein the relay node receiving the MCCH modification notification information before an MCCH modification boundary corresponding to the MCCH modification notification information and sending the MCCH modification notification information to the use equipment before the MCCH modification boundary corresponding to the MCCH modification notification information comprises:
receiving, by the relay node, the MCCH modification notification information from the base station according to a first time specified by a system or a standard, wherein the first time is before the MCCH modification boundary corresponding to the MCCH modification notification information; and
sending, by the relay node, the received MCCH modification notification information to the user equipment according to a second time specified by the system or the standard, wherein the second time is before the MCCH modification boundary corresponding to the MCCH modification notification information.

7. The method according to claim 5, wherein the relay node receives the MCCH modification notification information and sends the MCCH modification notification information to the use equipment before the MCCH modification boundary corresponding to the MCCH modification notification information comprises:
receiving, by the relay node, the MCCH modification notification information by listening notification information sent from the base station when the base station sends the MCCH modification notification information, wherein the base station sends the MCCH modification notification information before the MCCH modification boundary corresponding to the MCCH modification notification information; and
sending, by the relay node, the MCCH modification notification information listened from the base station to the user equipment after receiving the MCCH modification notification information.

8. The method according to claim 7, further comprising:
receiving, by the relay node, configuration information for MCCH modification notification from the base station before receiving the MCCH modification notification information, wherein
the receiving the configuration information for MCCH modification notification by the relay node comprises:
receiving, by the relay node, the MCCH modification notification information according to the received configuration information for MCCH modification notification.

9. The method according to claim 8, wherein the configuration information for MCCH modification notification comprises:
sending position information corresponding to the MCCH modification notification information; and
minimum times that the relay node and/or the user equipment attempts to receive the MCCH modification notification information when the MCCH modification notification information is not detected in an MCCH modification period.

10. The method according to claim 4, further comprising:
receiving, by the relay node, the configuration information for MCCH modification notification from the base station; and
sending, by the relay node, the configuration information for MCCH modification notification to the user equipment.

11. The method according to claim 10, wherein the relay node receives the configuration information for MCCH modification notification and sends the configuration information for MCCH modification notification to the use equipment before the MCCH modification boundary corresponding to the MCCH modification notification information.

12. The method according to claim 10, wherein the relay node receives the configuration information for MCCH modification notification from the base station according to a third time specified by a system or a standard, wherein the third time specified by the system or the standard is before an MCCH modification boundary corresponding to the MCCH modification notification information.

13. The method according to claim 4, wherein the relay node sends the MCCH modification notification information to the user equipment by carrying the MCCH modification notification information in a PDCCH signaling.

14. The method according to claim 4, further comprising:
muting, by the relay node, an Orthogonal Frequency Division Multiplexing (OFDM) symbol of transmission data in the MBSFN sub-frame which is used to send the MCCH modification notification information and indicated by the MCCH modification information sending configuration information.

15. The method according to claim 3, wherein the relay node receives the MCCH configuration information sent from the network-side device through a dedicated control signaling; and
the relay node sends the MCCH configuration information to the user equipment through the dedicated control signaling or a system broadcast message.

16. The method according to claim 1, wherein the receiving, by the user equipment, an eMBMS sent from a device other than the relay node according to a received control information of the eMBMS comprises:
receiving, by the user equipment, system information of the eMBMS sent from the relay node and multicast control channel information of the eMBMS sent from the device other than the relay node to obtain the control information of the eMBMS; and
acquiring, by the user equipment, data information of the eMBMS sent from the device other than the relay node according to the control information of the eMBMS.

17. The method according to claim 1, wherein the receiving, by the user equipment, an eMBMS sent from a device other than the relay node according to a received control information of the eMBMS comprises:

receiving, by the user equipment, the control information of the eMBMS transmitted by the relay node; and acquiring, by the user equipment, data information of the eMBMS sent from the device other than the relay node according to the control information.

18. The method according to claim 1, wherein the receiving, by the user equipment, an eMBMS sent from a device other than the relay node according to a received control information of the eMBMS comprises:

receiving, by the user equipment, the control information of the eMBMS sent from the device other than the relay node; and acquiring, by the user equipment, data information of the eMBMS sent from the device other than the relay node according to the control information.

19. A system for supporting an enhanced multimedia broadcast multicast service, eMBMS, in a relay network, comprising a network-side device, a relay node and a user equipment, wherein the network-side device is configured to send to the relay node a message for indicating a position of an MBSFN sub-frame related to the eMBMS in a transmission frame;

the relay node is configured to acquire the position of the MBSFN sub-frame in the transmission frame according to the message sent from the network-side device, and mute the MBSFN sub-frame according to the determined position; and the user equipment is configured to determine whether there is the MBSFN sub-frame muted by the relay node in the transmission frame sent from the relay node, and receive the eMBMS sent from a device other than the relay node according to the received control information of the eMBMS.

20. The system according to claim 19, wherein the relay node comprises:

a first receiving unit configured to receive a message for indicating a position of an Multicast/Broadcast over Single Frequency Network, MBSFN, sub-frame related to an eMBMS in a transmission frame, which is sent from the network-side device;

a position acquiring unit configured to acquire the position of the MBSFN sub-frame in the transmission frame indicated in the message; and a muting unit configured to muting the MBSFN sub-frame according to the acquired position of the MBSFN sub-frame in the transmission frame.

21. The system according to claim 20, wherein the muting unit mutes the MBSFN sub-frame by one of the following ways:

setting the MBSFN sub-frame as a blank sub-frame; or setting the MBSFN sub-frame as a blank MBSFN sub-frame; or carrying control information of the eMBMS in the MBSFN sub-frame.

22. The system according to claim 20, wherein the first receiving unit is further configured to receive MCCH configuration information sent from the network-side device; and the relay node further comprises a first sending unit configured to send the MCCH configuration information to a user equipment.

23. The system according to claim 22, wherein the first receiving unit receives the MCCH configuration information sent from the network-side device through a dedicated control signaling; and the first sending unit sends the MCCH configuration information to the user equipment through the dedicated control signaling or a system broadcast message.

24. The system according to claim 19, wherein the network-side device, comprises:

a determination unit configured to determine a position of an Multicast/Broadcast over Single Frequency Network, MBSFN, sub-frame related to an eMBMS in a transmission frame; and a second sending unit configured to send a message for indicating the position of the MBSFN sub-frame related to the eMBMS in the transmission frame to a relay node according to the determined position.

25. The system according to claim 24, wherein the second sending unit sends, through a configured dedicated signaling, a message for indicating the position of the MBSFN sub-frame related to the eMBMS in the transmission frame to the relay node.

26. The system according to claim 19, wherein the user equipment comprises:

a confirmation unit configured to confirm whether there is an MBSFN sub-frame muted by a relay node in a transmission frame sent from the relay node; and a second receiving unit configured to receive an eMBMS sent from a device other than the relay node according to the received control information of the eMBMS if the confirmation unit confirms the existence of the muted MBSFN sub-frame.

27. The system according to claim 26, wherein the second receiving unit is configured to receive system information of the eMBMS sent from the relay node and multicast control channel information of the eMBMS sent from the device other than the relay node to obtain control information of the eMBMS; and acquire data information of the eMBMS sent from the device other than the relay node according to the control information of the eMBMS.

28. The system according to claim 26, wherein the second receiving unit is configured to receive control information of the eMBMS transmitted from the relay node, and acquire data information of the eMBMS sent from the device other than the relay node according to the control information.

29. The system according to claim 26, wherein the second receiving unit is configured to receive control information of the eMBMS sent from the device other than the relay node, and acquire data information of the eMBMS sent from the device other than the relay node according to the control information.

30. The system according to claim 19, wherein the relay node comprises:

a first receiving module configured to receive MCCH modification notification information from a base station; and a first sending module configured to send the received MCCH modification notification information to a user equipment.

31. The system according to claim 30, wherein the first receiving module is configured to receive the MCCH modification notification information before an MCCH modification boundary corresponding to the MCCH modification notification information; and the first sending module is configured to send the MCCH modification notification information to the user equipment before the MCCH modification boundary corresponding to the MCCH modification notification information.

32. The system according to claim 31, wherein the first receiving module is configured to receive the MCCH modification notification information from the base station according to a first time specified by a system or a standard, and the first time is before the MCCH modification boundary corresponding to the MCCH modification notification information; and the first sending module is configured to send the received MCCH modification notification information to the user equipment according to a second time specified by the system or the standard, and the second time is before the MCCH modification boundary corresponding to the MCCH modification notification information.

33. The system according to claim 31, wherein the first receiving module is configured to receive the MCCH modification notification information by listening the notification information sent from a base station when the base station sends the MCCH modification notification information, wherein the base station sends the MCCH modification notification information before an MCCH modification boundary corresponding to the MCCH modification notification information; and a first sending module is configured to send to the user equipment the MCCH modification notification information listened from the base station after the first receiving module receives the MCCH modification notification information.

34. The system according to claim 30, further comprising a third receiving module configured to receive configuration information for MCCH modification notification from the base station before the first receiving module receives the MCCH modification notification information from the base station, wherein the first receiving module is configured to receive the MCCH modification notification information according to the configuration information for MCCH modification notification received by the third receiving module.

35. The system according to claim 30, wherein the relay node further comprises:

a second receiving module configured to receive an configuration information for MCCH modification notification from the base station; and a second sending module configured to send the configuration information for MCCH modification notification received by the second receiving module to the user equipment.

36. The system according to claim 35, wherein the second receiving module is configured to receive the configuration information for MCCH modification notification before the MCCH modification boundary corresponding to the MCCH modification notification information; and the second sending module is configured to send the configuration information for MCCH modification notification to the user equipment before the MCCH modification boundary.

37. The system according to claim 35, wherein the relay node further comprises:

a setting module configured to mute an Orthogonal Frequency Division Multiplexing (OFDM) symbol of transmission data in the MBSFN sub-frame which is used to send MCCH modification notification information and indicated by the MCCH modification information sending configuration information received by the receiving module.

* * * * *